United States Patent
Chan

(10) Patent No.: US 9,570,216 B2
(45) Date of Patent: *Feb. 14, 2017

(54) ELASTOMERIC GRIPPING MEMBER FOR SPACER ASSEMBLY

(71) Applicant: Hubbell Incorporated, Shelton, CT (US)

(72) Inventor: Peter Chan, Markham (CA)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/809,980

(22) Filed: Jul. 27, 2015

(65) Prior Publication Data

US 2015/0332816 A1  Nov. 19, 2015

Related U.S. Application Data

(63) Continuation of application No. 13/771,716, filed on Feb. 20, 2013, now Pat. No. 9,093,202, which is a
(Continued)

(51) Int. Cl.
*H02G 7/14* (2006.01)
*H02G 7/12* (2006.01)
(Continued)

(52) U.S. Cl.
CPC ............... *H01B 17/14* (2013.01); *F16B 2/06* (2013.01); *H01B 17/16* (2013.01); *H01R 43/00* (2013.01);
(Continued)

(58) Field of Classification Search
CPC ............. H01B 17/14; H01B 17/16; F16B 2/06
(Continued)

(56) References Cited

U.S. PATENT DOCUMENTS 2,338,569 A  1/1944  Berhenke et al.
2,396,837 A  3/1946  Ellinwood
(Continued)

FOREIGN PATENT DOCUMENTS

DE  4225989 A1  3/1993
DE  4225989     4/1993
(Continued)

OTHER PUBLICATIONS

PCT/US2014/017120 International Preliminary Report on Patentability mailed Sep. 3, 2015.
(Continued)

*Primary Examiner* — Sherman Ng
(74) *Attorney, Agent, or Firm* — Michael Best & Friedrich, LLP

(57) ABSTRACT

A spacer assembly includes a first clamping body having first and second ends and first and second protrusions extending from the first and second ends, respectively. A second clamping body has third and fourth ends and third and fourth protrusions extending from the third and fourth ends, respectively. A first gripping member disposed between the first and third ends has first and second openings for receiving the first and third protrusions, respectively, such that the first and third protrusions pass completely through the first and second openings to contact a first conductor received by the first gripping member. A second gripping member disposed between the second and fourth ends has third and fourth openings for receiving the second and fourth protrusions, respectively, such that the second and fourth protrusions pass completely through the third and fourth openings to contact a second conductor received by the second gripping member.

19 Claims, 7 Drawing Sheets

Related U.S. Application Data continuation-in-part of application No. 13/473,987, filed on May 17, 2012, now Pat. No. 9,412,493.

(60) Provisional application No. 61/494,501, filed on Jun. 8, 2011.

(51) Int. Cl.
  *H01B 17/00* (2006.01)
  *H01B 17/14* (2006.01)
  *H01B 17/16* (2006.01)
  *H01R 43/00* (2006.01)
  *F16B 2/06* (2006.01)

(52) U.S. Cl.
  CPC ........... *H02G 7/12* (2013.01); *Y10T 24/44256* (2015.01); *Y10T 29/49117* (2015.01)

(58) Field of Classification Search
  USPC .................................. 174/42, 146, 40 R, 154
  See application file for complete search history.

(56) References Cited

U.S. PATENT DOCUMENTS

| | | |
|---|---|---|
| 2,396,838 A | 3/1946 | Ellinwood |
| 2,915,580 A | 12/1959 | Gill et al. |
| 2,974,184 A | 3/1961 | Mather |
| 3,161,721 A | 12/1964 | Torr |
| 3,617,609 A | 11/1971 | Tuttle |
| 3,743,762 A * | 7/1973 | Annas ................. H02G 7/12 174/146 |
| 3,870,815 A | 3/1975 | Hawkins |
| 3,895,409 A | 7/1975 | Kwatonowski |
| 3,924,055 A | 12/1975 | Moore et al. |
| 3,925,595 A | 12/1975 | Hawkins |
| 3,940,553 A | 2/1976 | Hawkins |
| 3,963,855 A | 6/1976 | Hawkins et al. |
| 3,971,881 A | 7/1976 | Hawkins |
| 4,012,582 A | 3/1977 | Hawkins |
| 4,178,467 A | 12/1979 | Hawkins |
| 4,525,596 A | 6/1985 | Diana |
| 5,371,320 A * | 12/1994 | Torok ................. H02G 7/125 174/146 |
| 6,242,693 B1 | 6/2001 | Abe et al. |
| 6,448,503 B1 | 9/2002 | Mc Kinnon et al. |
| 6,595,472 B1 | 7/2003 | Pisczak |
| 7,677,933 B2 | 3/2010 | Copper et al. |
| 8,203,074 B2 | 6/2012 | Goch |
| 2005/0260034 A1 | 11/2005 | Arbona |
| 2008/0173462 A1 | 7/2008 | Whapham et al. |
| 2012/0305290 A1 | 12/2012 | De France et al. |

FOREIGN PATENT DOCUMENTS

| | | |
|---|---|---|
| WO | 2012170207 | 12/2012 |
| WO | 2012170207 A1 | 12/2012 |

OTHER PUBLICATIONS

Office Action from the United States Patent and Trademark Office for U.S. Appl. No. 13/473,987 dated May 29, 2015 (15 pages).

* cited by examiner

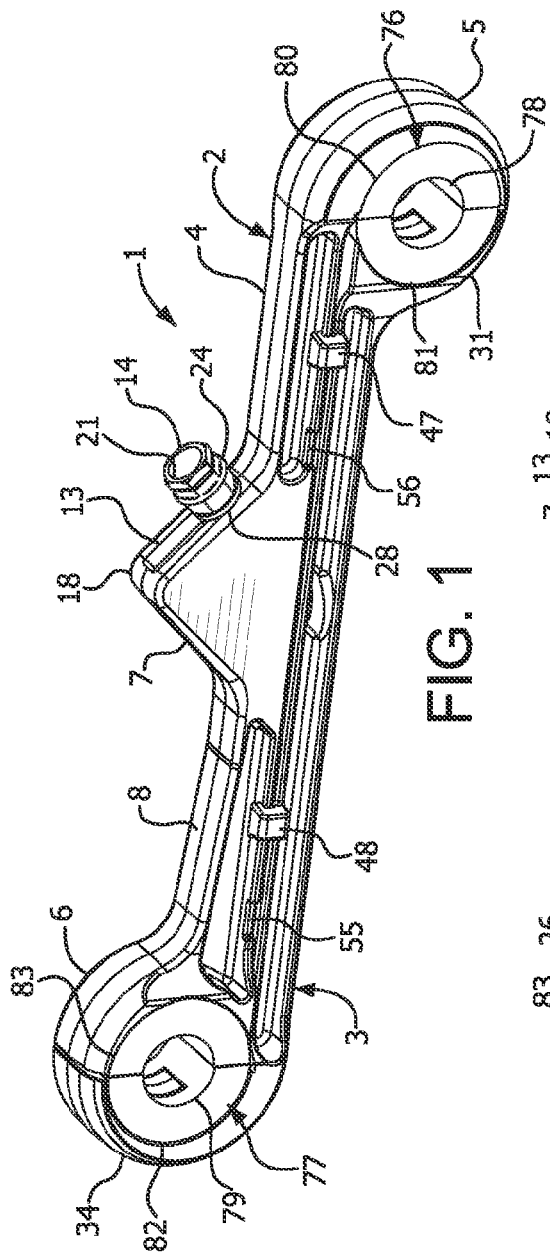
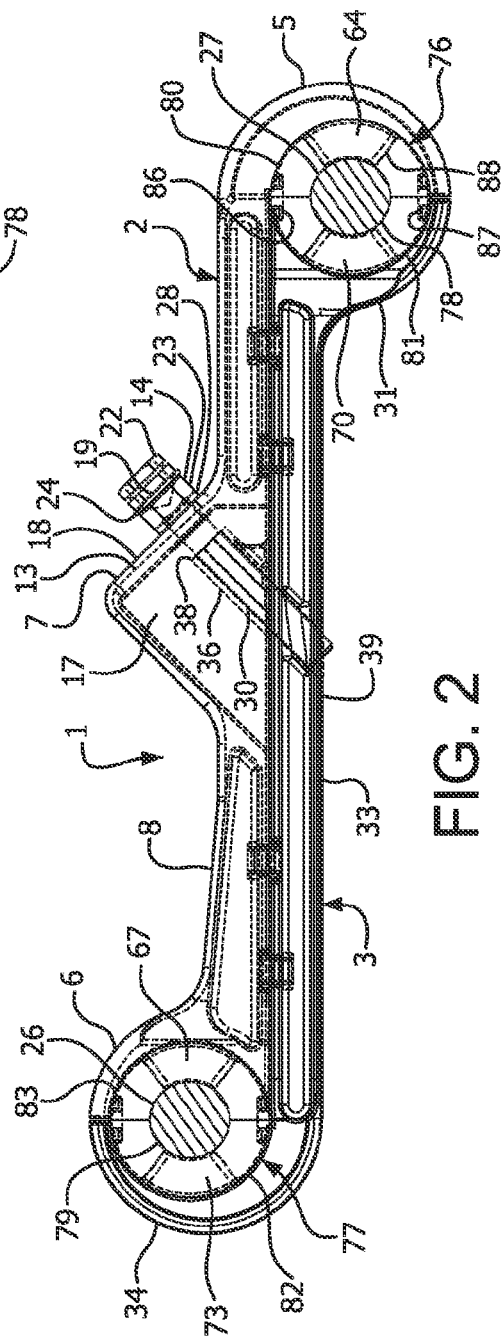
FIG. 1
FIG. 2

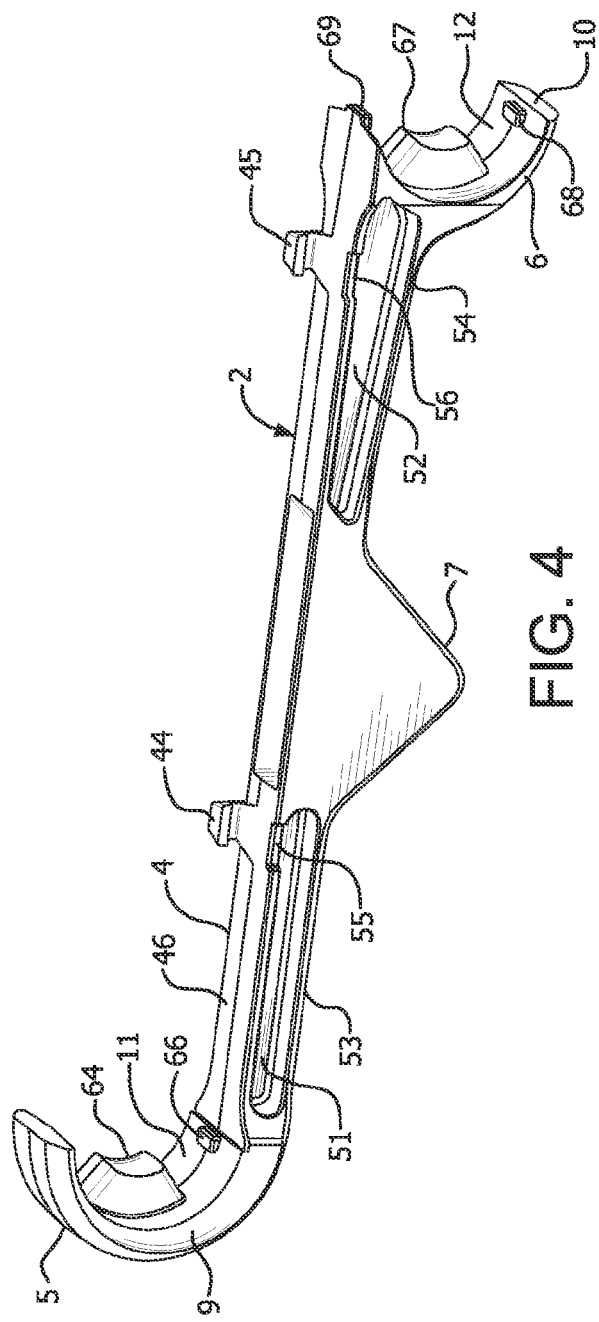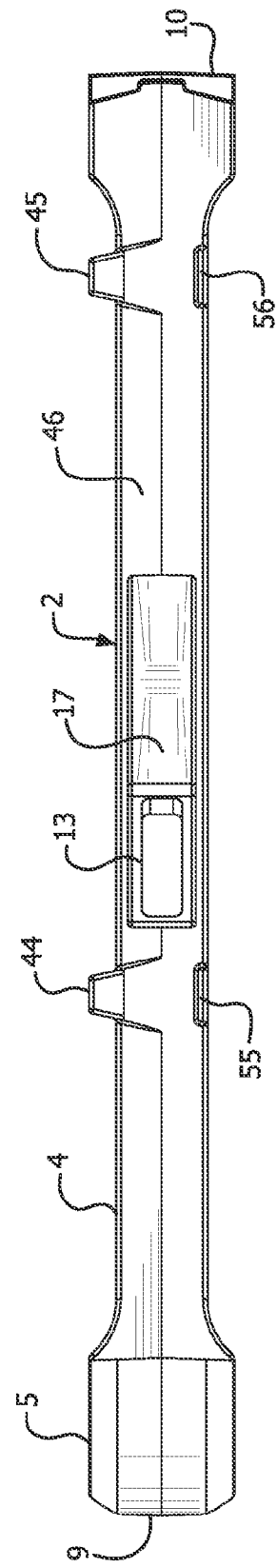

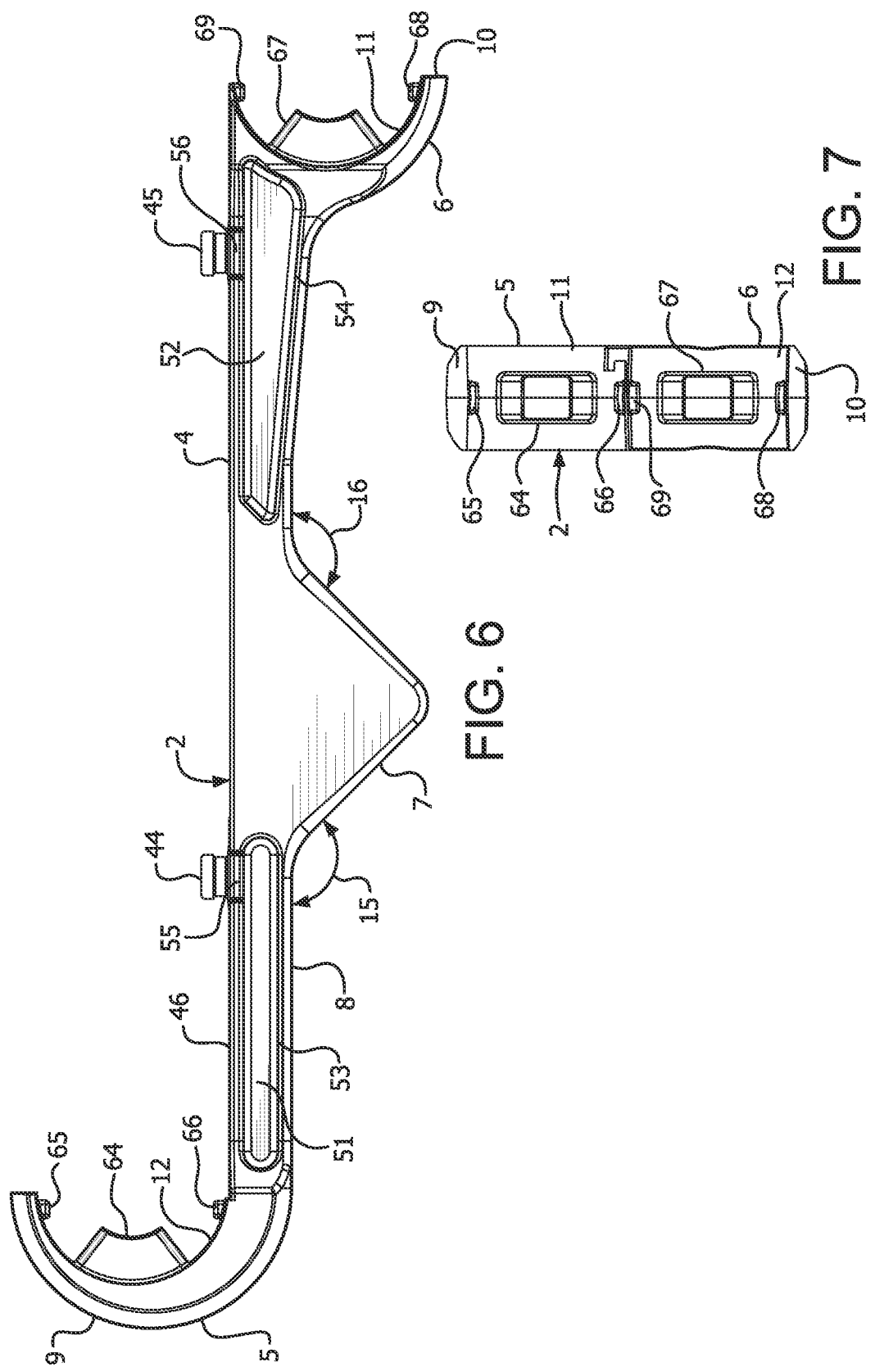

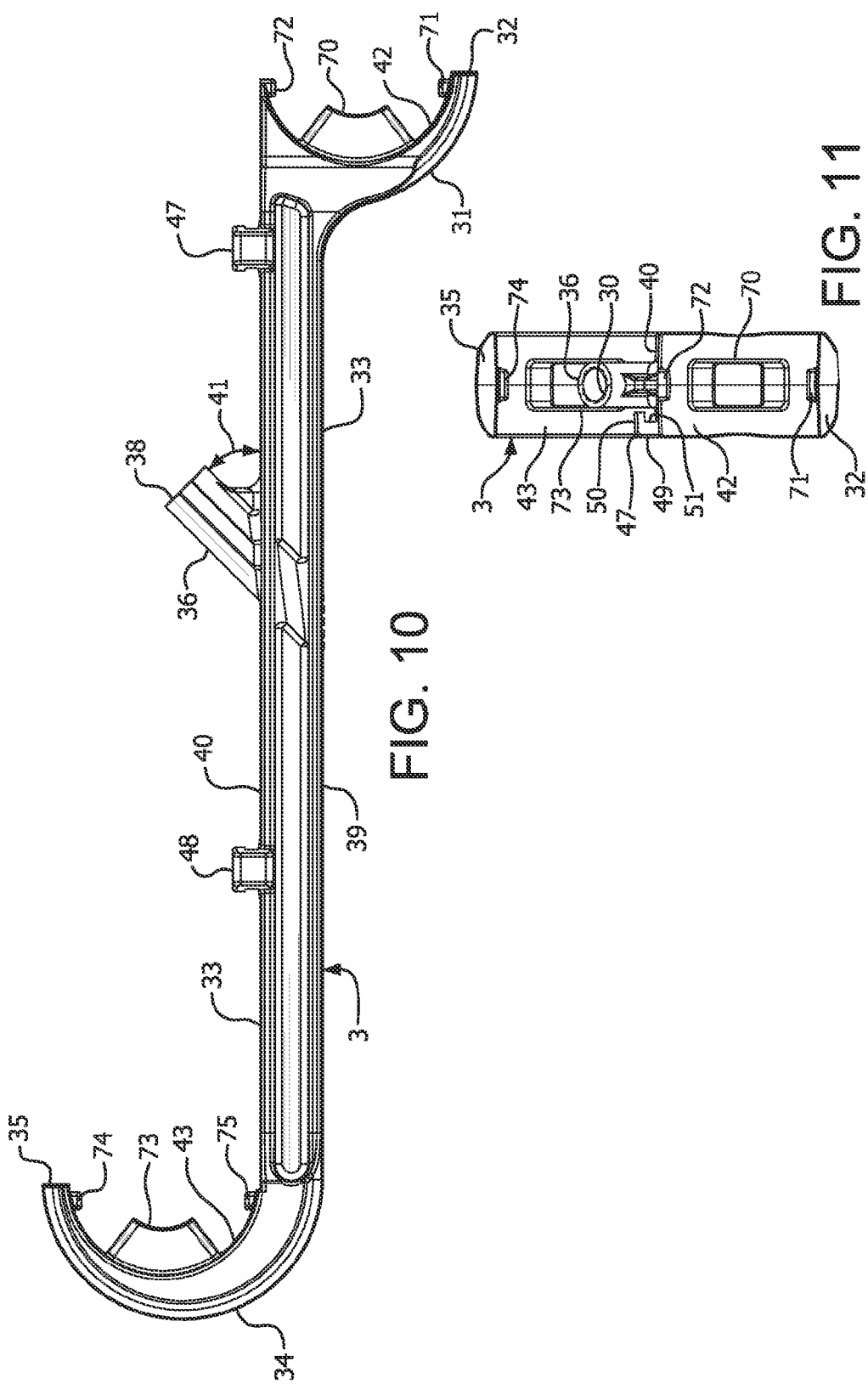

ELASTOMERIC GRIPPING MEMBER FOR SPACER ASSEMBLY

CROSS-REFERENCE TO RELATED APPLICATIONS

This application is a continuation of U.S. patent application Ser. No. 13/771,716, now U.S. Pat. No. 9,093,202, which is a continuation-in-part under of U.S. patent application Ser. No. 13/473,987, filed May 17, 2012, which claims the benefit of U.S. Provisional Patent Application Ser. No. 61/494,501, which was filed Jun. 8, 2011, all of which are hereby incorporated by reference in their entirety.

FIELD OF THE INVENTION

The present invention relates generally to a gripping member disposed between clamping bodies of a spacer assembly and a received conductor. More particularly, the present invention relates to a spacer assembly for spacing apart received conductors in which metal-to-metal and metal-to-elastomer contact is provided between the spacer assembly and the received conductors. Still more particularly, the present invention relates to a spacer assembly for spacing apart conductors in which metal-to-metal contact is provided between clamping bodies of the spacer assembly and the received conductors and metal-to-elastomer contact is provided between gripping members of the spacer assembly and the received conductors.

BACKGROUND OF THE INVENTION

In the electrical utilities industry, conductor bundles can be used to transmit bulk power with reduced loss, thereby increasing transmission efficiency. A conductor bundle is a series of two, three or four conductors spaced apart by spacers to maintain spacing between each of the conductors. Bundled conductors are used on high-voltage power lines to help reduce energy losses (due to the corona effect), audible noise and radio interference. As a result, the conductor bundles improve the power transmission process.

However, one disadvantage associated with conductor bundles is that they may have conductor clashing due to subspan oscillation in high wind conditions or fault current. The spacers must maintain separation between the conductors of the bundle to minimize the effects of both subspan oscillation and fault current. Accordingly, a need exists for a spacer assembly that facilitates maintaining separation between conductors.

Elastomeric gripping members of spacer assemblies for conductor bundles are sometimes disposed between clamping bodies of the spacer assemblies and the received conductors. Elastomeric gripping elements reduces stress concentration on the conductor surface but typically result in a lower force when clamp slip occurs. However if slippage does occur, the elastomeric gripping members do not damage the surface of the conductor. Because a metal-to-metal clamp interface without the elastomeric gripping members typically has higher clamp slip, it is less likely for the metal-to-metal clamp interface to slip unless very severe forces occur on the power lines or the product was improperly installed. If slippage does occur, the metal only clamping interface can create higher stress concentration on the conductor surface, specifically at the conductor entry, thereby resulting in a higher chance for the conductor surface/outer strands to be damaged. Also, the metal-to-metal clamp interface without the elastomeric gripping members are more prone to fretting at the conductor entry/exit. After prolonged exposure to high temperatures, which can exceed 250° C., the ability of the elastomeric gripping members to substantially prevent such slippage decreases. Accordingly, a need exists for a spacer assembly for conductors in which both metal-to-metal and elastomer-to-metal clamp contact exists.

Additionally, some conventional spacer assemblies provide entirely elastomer-to-metal contact between the gripping members of the spacer assemblies and the received conductors. Accordingly, a need exists to provide a spacer assembly in which both metal-to-elastomer and metal-to-metal contact substantially prevents slippage between the spacer assembly and the received conductors after prolonged exposure to high temperatures.

SUMMARY OF THE INVENTION

An object of the present invention is to provide a spacer assembly that maintains a predetermined spacing between received conductors.

Another object of the present invention is to provide a spacer assembly that substantially prevents slippage between the spacer assembly and received conductors after prolonged exposure to high temperatures.

Another object of the present invention is to provide a gripping member for spacer assembly that substantially prevents slippage between the spacer assembly and the received conductors.

Still another object of the present invention is to provide a spacer assembly in which metal-to-elastomer and metal-to-metal contact between the spacer assembly and the received conductors substantially prevents slippage between the spacer assembly and received conductors after prolonged exposure to high temperatures.

The foregoing objects are basically attained by a spacer assembly including a first clamping body having first and second ends and first and second protrusions extending from the first and second ends, respectively. A second clamping body has third and fourth ends and third and fourth protrusions extending from the third and fourth ends, respectively. A first gripping member disposed between the first and third ends has first and second openings for receiving the first and third protrusions, respectively, such that the first and third protrusions pass completely through the first and second openings to contact a first conductor received by the first gripping member. A second gripping member disposed between the second and fourth ends has third and fourth openings for receiving the second and fourth protrusions, respectively, such that the second and fourth protrusions pass completely through the third and fourth openings to contact a second conductor received by the second gripping member. The protrusions provide metal-to-metal contact with the received conductor and the gripping members provide elastomer-to-metal contact with the received conductor.

The foregoing objects are also basically attained by a spacer assembly including a first clamping body having first and second ends and first and second protrusions extending from the first and second ends, respectively. A second clamping body has third and fourth ends and third and fourth protrusions extending from the third and fourth ends, respectively. A first gripping part has a first opening for receiving the first protrusion. A second gripping part has a second opening for receiving the second protrusion. A third gripping part has a third opening for receiving the third protrusion. The first and third gripping parts form a first gripping member between the first ends of the first and second clamping bodies such that the first and third protrusions extend completely through the first gripping member to engage a first conductor received therein. A fourth gripping part has a fourth opening for receiving the fourth protrusion. The second and fourth gripping parts form a second gripping member between the second ends of the first and second clamping bodies such that the second and fourth protrusions extend completely through the second gripping member to engage a second conductor received therein. The protrusions provide metal-to-metal contact with the received conductor and the gripping parts provide elastomer-to-metal contact with the received conductor.

The foregoing objects are also basically attained by a method of spacing conductors in which a first clamping body is connected to a second clamping body. A gripping member is disposed between respective ends of the first and second clamping bodies such that a protrusion extending outwardly from each conductor end passes completely through the gripping member. A conductor is passed through the gripping members such that the protrusions and the gripping members contact the conductor, thereby providing both metal-to-metal and elastomer-to-metal contact with the received conductors.

The metal-to-metal contact increases the force at which the clamp slips, and elastomeric gripping elements at the conductor entry and exit reduce the stress concentration and fretting in these areas. The metal-to-metal contact transmits heat effectively from the conductor to the aluminum frame resulting in lower temperature at the surfaces of the elastomer gripping element. With both metal-to-metal and elastomer-to-metal clamp contact, slippage between the spacer assembly and the received conductors is substantially prevented.

Objects, advantages, and salient features of the invention will become apparent from the following detailed description, which, taken in conjunction with the annexed drawings, discloses an exemplary embodiment of the present invention.

As used in this application, the terms "front," "rear," "upper," "lower," "upwardly," "downwardly," and other orientational descriptors are intended to facilitate the description of the exemplary embodiment of the present invention, and are not intended to limit the structure thereof to any particular position or orientation.

BRIEF DESCRIPTION OF THE DRAWINGS

The above benefits and other advantages of the various embodiments of the present invention will be more apparent from the following detailed description of exemplary embodiments of the present invention and from the accompanying drawing figures, in which:

FIG. 1 is a perspective view of a spacer assembly having elastomeric gripping members in accordance with an exemplary embodiment of the present invention in which the clamping bodies are in a closed position;

FIG. 2 is a side elevational view in partial cross section of the spacer assembly of FIG. 1 receiving conductors;

FIG. 4 is a perspective view of a first clamping body of the spacer assembly of FIG. 1;

FIG. 5 is a top plan view of the first clamping body of FIG. 4;

FIG. 6 is a side elevational view of the first clamping body of FIG. 4;

FIG. 7 is a front elevational view of the first clamping body of FIG. 4;

FIG. 10 is a side elevational view of the second clamping body of FIG. 8;

FIG. 11 is a front elevational view of the second clamping body of FIG. 4;

Throughout the drawings, like reference numerals will be understood to refer to like parts, components and structures.

DETAILED DESCRIPTION OF EXEMPLARY EMBODIMENT

In an exemplary embodiment of the present invention shown in FIGS. 1-16, a spacer assembly 1 is adapted to receive first and second conductors 26 and 27 and maintain a fixed spacing therebetween. As shown in FIG. 2, the conductors 26 and 27 are not insulated. Accordingly, maintaining a fixed spacing between the high voltage conductors 26 and 27 substantially reduces/minimizes conductor clashing due to subspan oscillation in high wind conditions or fault current. The spacer assembly 1 in accordance with the exemplary embodiment of the present invention maintains a fixed distance between the uninsulated high voltage conductors 26 and 27 to substantially reduce/minimize conductor clashing due to subspan oscillation in high wind conditions or fault current.

Figure 3:
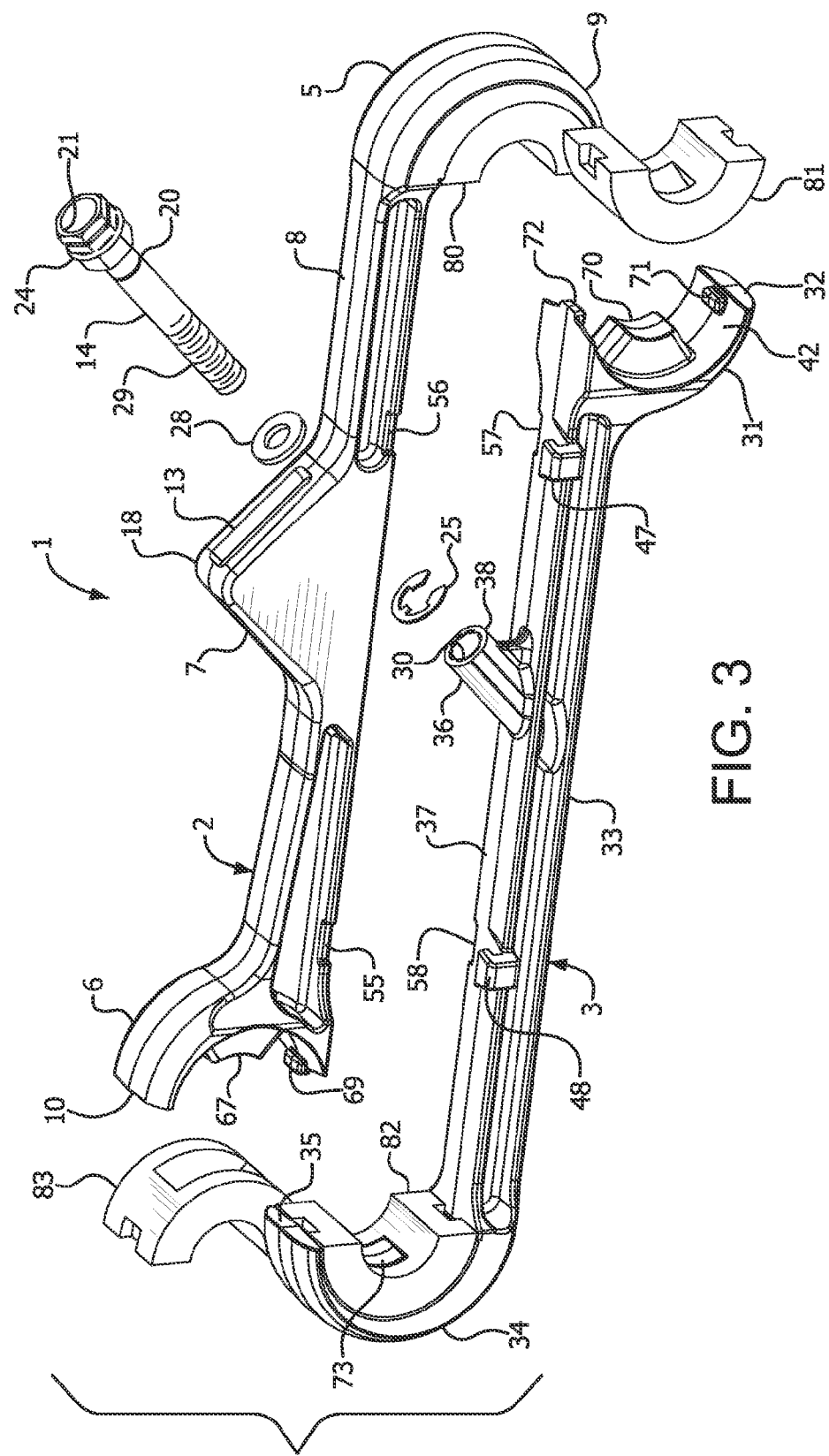
FIG. 3 is an exploded perspective view of the spacer assembly of FIG. 1.

The spacer assembly 1 has a first clamping body, or an upper body casting, 2 and a second clamping body, or lower body casting, 3, as shown in FIGS. 1-11. The first clamping body 2 has a first conductor receiving portion 5 disposed at a first end 9 of a connecting arm 4. A second conductor receiving portion 6 is disposed at a second end 10 of the connecting arm 4. The conductor receiving portions 5 and 6 are preferably substantially C-shaped and extend in opposite directions from the connecting arm 4, as shown in FIGS. 3 and 6. The first conductor receiving portion 5 extends downwardly from the connecting arm 4 and the second conductor receiving portion 6 extends upwardly therefrom. Inner surfaces 11 and 12 of the conductor receiving portions 5 and 6 preferably face the same direction, e.g., to the right as shown in FIGS. 4 and 6. The first and second clamping bodies 2 and 3 are preferably made of a metal, such as aluminum.

A tapered protrusion 7 extends upwardly from an upper surface 8 approximately mid-way along a length of the connecting arm 4, as shown in FIG. 1-3. Preferably, the protrusion 7 is an isosceles trapezoid prism. The protrusion 7 has an elongated slot 13 for receiving a fastener 14, as shown in FIGS. 1-3. Preferably, the protrusion 7 is an isosceles triangle with base angles of approximately 45 degrees. Accordingly, the preferred angles 15 and 16 between the sides of the protrusion 7 and the upper surface 8 of the first clamping body 2, as shown in FIG. 6, is preferably approximately 135 degrees. The protrusion 7 has a correspondingly shaped cavity 17, as shown in FIG. 2. The elongated slot 13 is disposed in an outer surface 18 of the protrusion 7 to access the cavity 17 and through which the fastener 14 rides, as shown in FIGS. 1-3.

The fastener 14 has a first retaining groove 19 in the hex head portion of the fastener, as shown in FIGS. 1 and 2. The fastener 14 can also have a second retaining groove 20 in the unthreaded portion of the shank, as shown in FIG. 3. The fastener 14 preferably has a counter bore hole 21 in the hex head that facilitates, in addition to the retaining groove 19, the breaking off of the top portion 22 of the fastener 14. The two-stage head of the fastener 14 allows the top portion 22 to break away from the lower portion 23 during installation.

A first retainer 24 is disposed in the first retaining groove 19 to prevent the tool, such as a wrench or socket, from making contact with the second stage 23 of the two stage head. The top portion 22 is designed to break off at a pre-determined torque. The pre-determined torque is required to apply the correct amount of pressure to the conductors 26 and 27. When the pre-determined torque is obtained, the top portion 22 of the fastener 14 breaks off, thereby preventing too much pressure from being exerted on the conductors 26 and 27 (FIG. 2). The second stage 23 of the fastener 14 is for removing the spacer assembly 1 when required. A shank retainer 25 disposed in the second retaining groove 20 prevents the fastener 14 from separating from the cavity 17, as shown in FIGS. 2 and 3. A flat washer 28 is installed between the two stage head 23 and the upper surface 18 of the isosceles trapezoid prism-shaped protrusion 7. The end of the fastener 14 has a threaded portion 29 corresponding to a fastener opening 30 in the second clamping body 3, as shown in FIGS. 3, 8 and 9.

The second clamping body 3 has a first conductor receiving portion 31 disposed at a first end 32 of a connecting arm 33. A second conductor receiving portion 34 is disposed at a second end 35 of the connecting arm 33. The second clamping body 3 has a mounting post 36 extending outwardly from an upper surface 37 of the connecting arm 33, as shown in FIGS. 3 and 8-11. The threaded fastener opening 30 extends from a free end 38 of the mounting post 36 to a lower surface 39 of the connecting arm 33, as shown in FIGS. 2 and 3. Preferably, an angle 41 of approximately 45 degrees is formed between the mounting post 36 and the upper surface 40 of the connecting arm 33 of the second clamping body 3. The mounting post 36 is received within the cavity 17 of the protrusion 7 when the second clamping body 3 is connected to the first clamping body 2, as shown in FIGS. 1 and 2.

Figure 8:
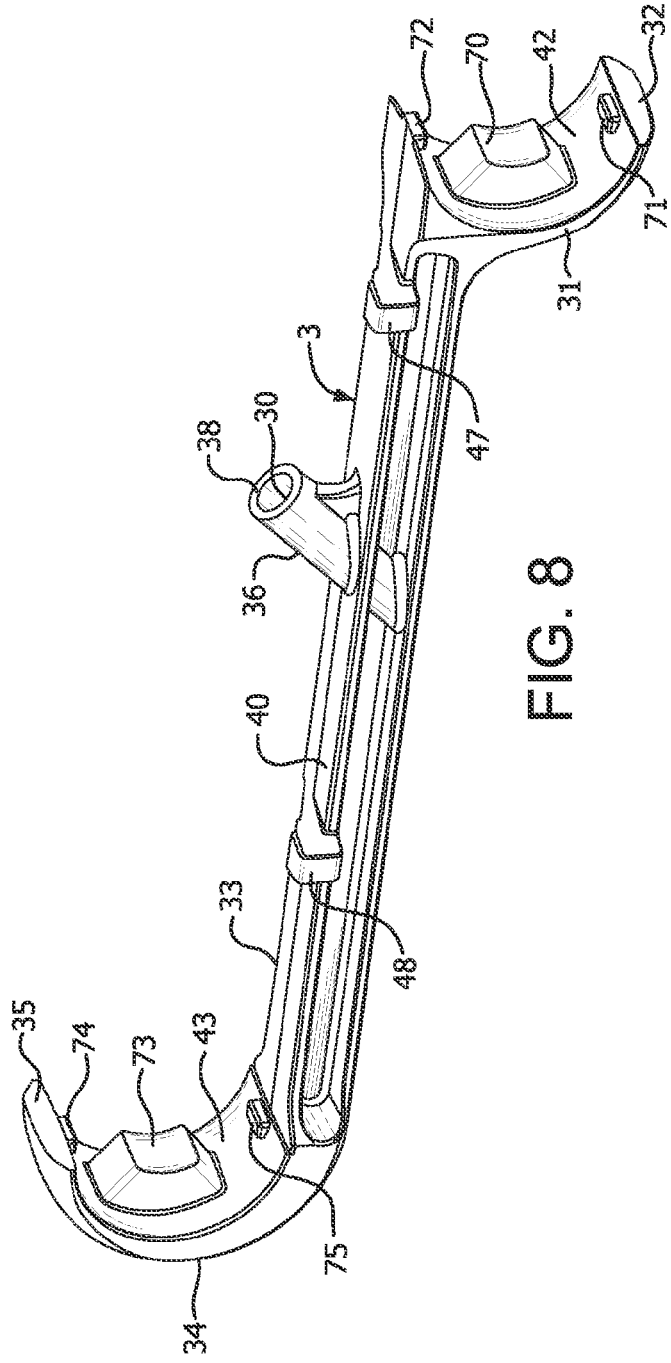
FIG. 8 is a perspective view of a second clamping body of the spacer assembly of FIG. 1.
Figure 9:
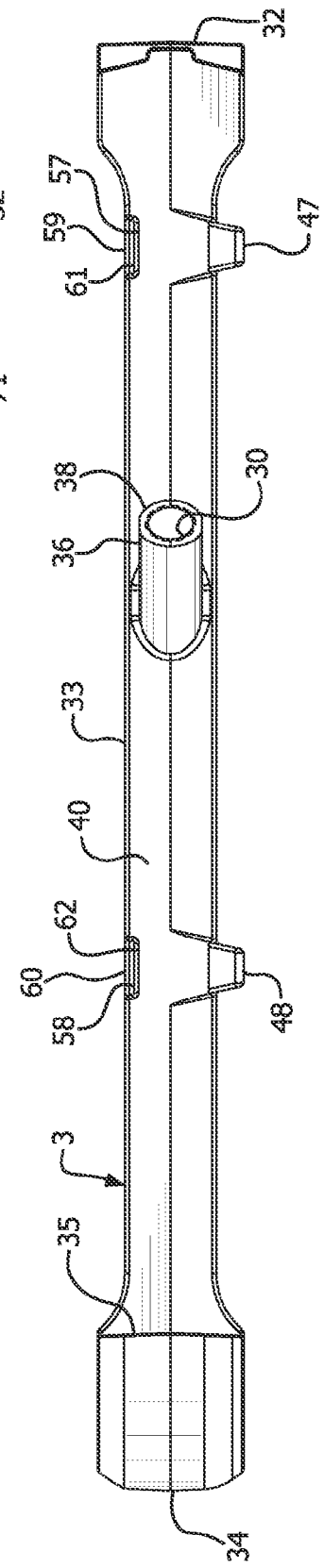
FIG. 9 is a top plan view of the second clamping body of FIG. 8.
Figure 14:
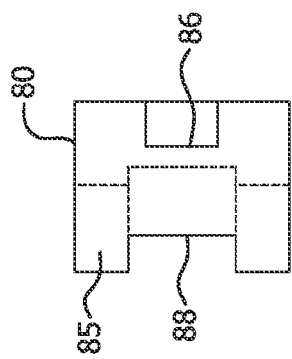
FIG. 14 is a top plan view of the gripping member of FIG. 12.

The conductor receiving portions 31 and 34 of the second clamping body 3 are preferably substantially C-shaped and extend in opposite directions from the connecting arm 33, as shown in FIGS. 3, 8 and 10. The first conductor receiving portion 31 extends downwardly from the connecting arm 33 and the second conductor receiving portion 34 extends upwardly therefrom. Inner surfaces 42 and 43 of the conductor receiving portions 31 and 34 preferably face the same direction, e.g., to the right as shown in FIGS. 8 and 10.

The first clamping body 2 has a pair of tabs 44 and 45 extending downwardly from a lower surface 46 of the connecting arm 104, as shown in FIG. 6. The second clamping body 3 has a pair of tabs 47 and 48 extending upwardly from the upper surface 40 of the connecting arm 33, as shown in FIG. 10. Preferably, each of the tabs 44, 45, 47 and 48 is substantially identical. As an example, tab 47, as shown in FIG. 11, is preferably substantially C-shaped. A first leg 49 extends upwardly from the upper surface 40 of the connecting arm 33 of the second clamping body 3. A second leg 50 extends inwardly and substantially perpendicularly from the first leg 49 to form a groove 51 between the second leg 50 and the upper surface 40 of the connecting arm 33 of the second clamping body 3.

A pair of recesses 51 and 52 are formed in the connecting arm 4 of the first clamping body 2, as shown in FIGS. 4 and 6. The recesses 51 and 52 are preferably formed on an opposite side of the connecting arm 4 from the tabs 44 and 45 of the first clamping body 2, as shown in FIGS. 4 and 5. Shoulders 53 and 54 define the recesses 51 and 52. Slots or cut-outs 55 and 56 are formed in each shoulder 53 and 54, as shown in FIGS. 4 and 6, to allow the tabs 47 and 48 of the second clamping member 3 to pass through the cut-outs 55 and 56 and slide along the shoulders 53 and 54.

A pair of recesses 57 and 58 are formed in the connecting arm 33 of the second clamping body 3, as shown in FIG. 9. The recesses 57 and 58 are preferably formed on an opposite side of the connecting arm 33 from the tabs 47 and 48 of the second clamping body 3. Shoulders 59 and 60 define the recesses 57 and 58. Cut-outs 61 and 62 are formed in each shoulder 59 and 60 to allow the tabs 44 and 45 of the first clamping body 2 to pass through the cut-outs 61 and 62 and slide along the shoulders 59 and 60.

The inner surface 11 of the first conductor receiving portion 5 of the first clamping body 2 has a projection 64 extending outwardly therefrom, as shown in FIGS. 4, 6 and 7. The projection 64 is preferably substantially centered on the inner surface 11 of the first conductor receiving portion 5, as shown in FIG. 7. First and second tabs 65 and 66 extend outwardly from the inner surface 11, as shown in FIGS. 6 and 7. The projection 64 is preferably disposed between the tabs 65 and 66, as shown in FIG. 7. The inner surface 12 of the second conductor receiving portion 6 of the first clamping body 2 has a projection 67 extending outwardly therefrom, as shown in FIGS. 4, 6 and 7. The projection 67 is preferably substantially centered on the inner surface 12 of the second conductor receiving portion 6, as shown in FIG. 7. First and second tabs 68 and 69 extend outwardly from the inner surface 12, as shown in FIGS. 4, 6 and 7. The projection 67 is preferably disposed between the tabs 68 and 69, as shown in FIG. 7. The projections 64 and 67 and tabs 65, 66, 68 and 69 facilitate receiving gripping members 76 and 77. The projections 64 and 67 and the tabs 65, 66, 68 and 69 are preferably integrally formed with the first clamping body 2. Preferably, the first clamping body 2 is made of metal, such as an aluminum alloy.

The inner surface 42 of the first conductor receiving portion 31 of the second clamping body 3 has a projection 70 extending outwardly therefrom, as shown in FIGS. 8, 10 and 11. The projection 70 is preferably substantially centered on the inner surface 42 of the first conductor receiving portion 31, as shown in FIG. 11. First and second tabs 71 and 72 extend outwardly from the inner surface 42, as shown in FIGS. 8, 10 and 11. The projection 70 is preferably disposed between the tabs 71 and 72, as shown in FIG. 11. The inner surface 43 of the second conductor receiving portion 34 of the second clamping body 3 has a projection 73 extending outwardly therefrom, as shown in FIGS. 8, 10 and 11. The projection 73 is preferably substantially centered on the inner surface 43 of the second conductor receiving portion 34, as shown in FIG. 11. First and second tabs 74 and 75 extend outwardly from the inner surface 43, as shown in FIGS. 8, 10 and 11. The projection 73 is preferably disposed between the tabs 74 and 75, as shown in FIG. 11. The projections 70 and 73 and the tabs 71, 72, 74 and 75 facilitate receiving gripping members 76 and 77. The projections 70 and 73 and the tabs 71, 72, 74 and 75 are preferably integrally formed with the second clamping body 3. Preferably, the second clamping body 3 is made of metal, such as an aluminum alloy.

The first gripping member 76 is disposed between the first conductor receiving portions 5 and 31, as shown in FIGS. 1 and 2. The second gripping member 77 is disposed between the second conductor receiving portions 6 and 34. The gripping members 76 and 77 are preferably substantially cylindrical members having apertures 78 and 79 through which the conductors 26 and 27 are received. The first gripping member 76 preferably has two substantially identical gripping parts 80 and 81. The second gripping member preferably has two substantially identical gripping parts 82 and 83. The gripping members 76 and 77 are preferably made of an elastomeric material, such as rubber.

Figure 13:
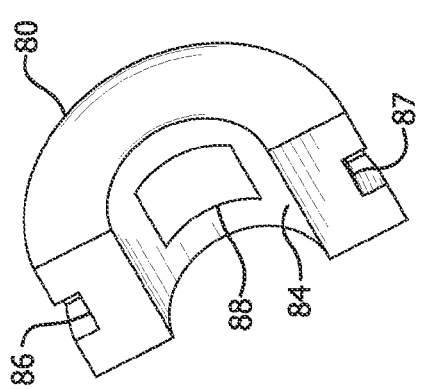
FIG. 13 is a right-side perspective view of the gripping member of FIG. 12.
Figure 16:
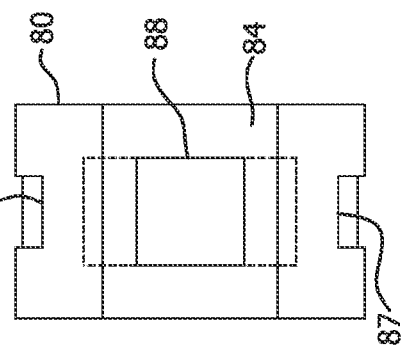
FIG. 16 is a front elevational view of the gripping member of FIG. 12.
Figure 12:
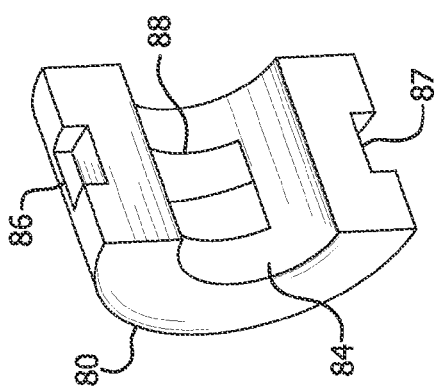
FIG. 12 is a left-side perspective view of the elastomeric gripping member of FIG. 1.
Figure 15:
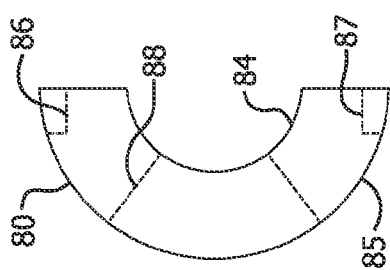
FIG. 15 is a side elevational view of the gripping member of FIG. 12.

Each of the gripping parts 80, 81, 82 and 83 is substantially identical. Accordingly, the description of the first gripping part 80 is applicable to each of the other gripping parts 81, 82 and 83. The gripping part 80, as shown in FIGS. 12-16, is preferably substantially semi-cylindrical such that the first and second gripping parts 80 and 81 form a substantially cylindrical gripping member 76 (FIGS. 1 and 2). The gripping part 80 has an inner surface 84 and an outer surface 85. The inner surface 84 is preferably curved to facilitate receiving the conductor. The gripping part 80 has a first recess 86 and a second recess 87 for receiving tabs disposed on the inner surfaces of the conductor receiving portions of the first and second clamping bodies 2 and 3. An opening 88 in the gripping part 80 extends from the inner surface 84 to the outer surface 85. The opening 88 is preferably disposed between the first and second recesses 86 and 87, as shown in FIG. 13. The opening 88 receives a projection on an inner surface of the conductor receiving portions. The opening 88 extends from the inner surface 84 to the outer surface 85 of the gripping part 80 such that the projection can pass completely through the gripping part. The curvature of the free end of the projection is preferably substantially similar to the curvature of the inner surface 84 of the gripping part to facilitate receiving a conductor. As shown in FIG. 2, the openings 88 in the gripping members 76 and 77 are preferably diametrically opposed. The recesses 86 and 87 are preferably diametrically opposed.

To assemble the spacer assembly 1, the first gripping member 76 is disposed between conductor receiving portions 5 and 31 and the second gripping member 77 is disposed between the conductor receiving portions 6 and 34, as shown in FIGS. 1-3. The openings 85 in the gripping members 76 and 77 are received by the projections 64, 67, 70 and 73 of each conductor receiving portion. The projections 64, 67, 70 and 73 pass completely through the openings 85 in the gripping members 76 and 77. The ends of the projections 64, 67, 70 and 73 are curved to facilitate contacting the conductors 26 and 27. The upper and lower recesses 86 and 87 of each gripping member 76 and 77 receive the tabs 65, 66, 68, 69, 71, 72, 74 and 75 of each conductor receiving portion to further facilitate securing the gripping members 76 and 77 to the clamping bodies 2 and 3. An adhesive can be used to further secure the gripping members 76 and 77 to the first and second clamping bodies 2 and 3.

The clamping bodies 2 and 3 are brought together such that the tabs 47 and 48 of the second clamping body 3 pass through the slots 55 and 56 in the first clamping body 2 and the tabs 44 and 45 of the first clamping body 2 pass through the slots 58 and 57 of the second clamping body 3. The shoulders of the first and second clamping bodies are received in the grooves 51 of the tabs 44, 45, 47 and 48, such that the first and second clamping bodies 2 and 3 can slide with respect to one another. The mounting post 36 of the second clamping body 3 is received in the cavity 17 of the protrusion 7 of the first clamping body 2, as shown in FIG. 2. The fastener 14 is passed through the elongated slot 13 in the protrusion 7 of the first clamping body 2 such that the threaded portion 29 thereof is received by the opening 30 in the mounting post 36. The second retainer 25 is disposed on the shaft of the fastener 14 after the fastener is passed through the elongated slot 13. The second retainer 25 prevents the fastener 14 from being withdrawn through the elongated slot 13.

When the spacer assembly 1 is assembled, the corresponding conductor receiving portions 5 and 31, and 6 and 34 can be moved toward or away from one another by tightening or loosening the fastener 14. When the spacer assembly 1 is moved to the closed position from the open position, the fastener 14 is tightened. The fastener 14 is threaded further into the opening 30 in the mounting post 36, thereby causing the fastener 14 to move down toward the bottom of the elongated slot 13, as shown in FIGS. 1 and 2. Accordingly, the clamping bodies 2 and 3 move toward one another, such that the corresponding conductor receiving portions 5 and 31, and 6 and 34 engage one another. The corresponding gripping parts 80 engage one another to form the gripping members 76 and 77 having apertures 78 and 79 therein to receive the conductors 26 and 27. The first retainer 24 on the fastener prevents the installation tool from engaging the lower portion 23 of the fastener 14. When the predetermined torque is obtained, the upper portion 22 of the fastener 14 separates from the lower portion 23, thereby preventing excess pressure from being exerted on the received conductors 26 and 27 (FIG. 2). The lower portion 23 of the fastener 14 allows the installation tool to loosen the fastener 14 when the spacer assembly 1 is to be opened. Loosening the fastener 14 moves the fastener up through the elongated slot 13 to an upper end thereof.

As shown in FIG. 2, the projections 64 and 70 pass completely through the openings 88 in the first gripping member 76 such that the projections 64 and 70 contact the received conductor 27. Accordingly, metal-to-metal contact is formed between the projections 64 and 70 and the conductor 27. Elastomer-to-metal contact is formed between the inner surface 84 of the first gripping member 76 and the conductor 27.

As shown in FIG. 2, the projections 67 and 73 pass completely through the openings 88 in the second gripping member 77 such that the projections 67 and 73 contact the received conductor 26. Accordingly, metal-to-metal contact is formed between the projections 67 and 73 and the conductor 26. Elastomer-to-metal contact is formed between the inner surface 84 of the second gripping member 77 and the conductor 26.

The metal-to-metal contact between the projections and the conductors substantially prevents slippage therebetween, particularly after the spacer assembly is subjected to prolonged exposure to high temperatures. The metal-to-metal contact provides contact with the conductors that is not subject to deterioration when subjected to high temperatures as is the elastomer-to-metal contact between the gripping members and the conductors. The metal-to-metal contact transmits heat effectively from the conductor to the aluminum frame resulting in lower temperature at the surfaces of the elastomer gripping element. Additionally, the elastomer-to-metal contact between the gripping members and the conductors provides a transition region (from the metal-tometal contact between the projections and the conductors) to substantially prevent damage to the conductors from the metal-to-metal contact. The metal-to-metal contact increases the force at which the clamp slips. Elastomeric gripping elements at the conductor entry and exit reduces the stress concentration and fretting in these areas. The metal-to-metal contact transmits heat effectively from the conductor to the aluminum frame, thereby resulting in lower temperature at the surfaces of the elastomer gripping element.

The foregoing embodiment and advantages are merely exemplary and are not to be construed as limiting the scope of the present invention. The description of an exemplary embodiment of the present invention is intended to be illustrative, and not to limit the scope of the present invention. Various modifications, alternatives and variations will be apparent to those of ordinary skill in the art, and are intended to fall within the scope of the invention as defined in the appended claims and their equivalents.

What is claimed is:

1. A spacer assembly, comprising: a first clamping body having a first end and a first protrusion extending from the first end; a second clamping body having a second end and connected to the first clamping body; and a gripping member disposed between the first and second ends and having a first opening that extends entirely through a portion of the gripping member, at least a portion of the first protrusion passing through the first opening to contact a first conductor received by the gripping member.

2. The spacer assembly according to claim 1, wherein the gripping member include an elastomeric material.

3. The spacer assembly according to claim 2, wherein the first protrusion includes metal.

4. The spacer assembly according to claim 1, wherein the first clamping body includes a first tab and a second tab and the gripping member includes a first recess receiving the first tab and a second recess receiving the second tab.

5. The spacer assembly according to claim 1, wherein the first protrusion includes a curved surface to facilitate contacting the received conductor.

6. The spacer assembly according to claim 1, wherein the second clamping body includes a second protrusion extending towards the first protrusion.

7. The spacer assembly according to claim 6, further comprising
a second gripping member having a second opening, at least a portion of the second protrusion passing through the second opening to contact the first conductor.

8. A spacer assembly, comprising:
a first clamping body having a first conductor receiving portion;
a second clamping body having a second conductor receiving portion, the first and second conductor receiving portions combining to receive a conductor;
a first protrusion extending from the first clamping body to engage the conductor; and
an elastomeric gripping member positioned in the first conductor receiving portion to engage the conductor, wherein the first protrusion extends entirely through a portion of the elastomeric gripping member.

9. The spacer assembly according to claim 8, wherein the first protrusion is substantially centered in the first conductor receiving portion.

10. The spacer assembly according to claim 8, wherein the first clamping body includes a first tab and a second tab and the gripping member includes a first recess receiving the first tab and a second recess receiving the second tab.

11. The spacer assembly according to claim 8, wherein the first protrusion includes a curved surface contacting the received conductor.

12. The spacer assembly according to claim 8, further comprising
a second gripping member positioned in the second conductor receiving portion.

13. The spacer assembly according to claim 12, wherein a second protrusion extends through the second gripping member.

14. A spacer assembly, comprising:
a first clamping body having a first conductor receiving portion;
a second clamping body having a second conductor receiving portion, the first and second conductor receiving portions combining to receive a conductor;
a protrusion including a first material for engaging the conductor; and
a gripping member positioned in the first conductor receiving portion including a second material for engaging the conductor, wherein the first protrusion extends entirely through at least a portion of the elastomeric gripping member.

15. The spacer assembly of claim 14, wherein the first material includes metal and the second material includes an elastomer.

16. The spacer assembly of claim 14, wherein the protrusion extends from the first clamping body.

17. The spacer assembly according to claim 16, wherein the protrusion includes a curved surface contacting the received conductor.

18. The spacer assembly according to claim 16, wherein the protrusion extends through the gripping member.

19. The spacer assembly according to claim 14, further comprising
a second gripping member positioned in the second conductor receiving portion.

* * * * *